Patented Dec. 16, 1952

2,622,035

UNITED STATES PATENT OFFICE 2,622,035

ALUMINUM SOLDER COMPOSITION

Eddie E. Stephens, Ranger, Tex., assignor of one-half to Ruby Stephens Hughes, Ranger, Tex.

No Drawing. Application June 13, 1950,
Serial No. 167,913

2 Claims. (Cl. 106—70)

This invention relates to a soldering composition.

An object of the present invention is to produce a solder which will effect a thorough and lasting union between the metal and the metallic article to be repaired.

Another object of the present invention is to produce an aluminum containing solder which is especially effective in the repair of articles fabricated of aluminum and galvanized iron.

A further object of the present invention is to produce a solder which is resistant to corrosion.

Briefly stated, the composition of the present invention comprises the metal aluminum, graphite, sulfur, and a liquid vehicle, the aluminum being present in the amount of about 10% by weight and that of sulfur in the amount of about 40% by weight. The vehicle employed is a mixture of methyl acetate and acetone, the mixture being made up of equal parts by weight. The graphite is preferably employed in an amount such that the final product will show it to be present in the amount of about 10% by weight.

Preferably, the composition of the present invention is prepared by incorporating one part by weight of powdered aluminum metal, one part by weight of powdered graphite in a liquid vehicle composed of two parts by weight of methyl acetate and two parts by weight of acetone. In a separate vessel is placed four parts by weight of flowers of sulfur, and the vessel heated until the sulfur has become molten, whereupon the vehicle containing aluminum and graphite is gradually added with stirring to the molten sulfur, and the mass agitated until it is thoroughly mixed. The mass is then poured into either a sand or china mold, and allowed to cool. In about five minutes the mass has set to a hard solid body. The solid body is then removed from the mold and is then ready for use.

This solder composition has been found to be particularly adapted for use in making permanent repairs on articles fabricated of aluminum, brass, galvanized iron, copper, tin, and the like, is resistant to corrosion, and is not affected by paint or rust. Also, such composition makes a permanent repair for cast iron.

I claim:

1. A solder composition consisting of aluminum, graphite, sulfur, methyl acetate, and acetone.

2. A solder composition consisting of one part by weight of aluminum, one part by weight of graphite, two parts by weight of methyl acetate, two parts by weight of acetone, and four parts by weight of sulfur.

EDDIE E. STEPHENS.

REFERENCES CITED

The following references are of record in the file of this patent:

UNITED STATES PATENTS

| Number | Name | Date |
|---|---|---|
| 1,263,398 | Ferris | Apr. 23, 1918 |
| 1,364,224 | Walker | Jan. 4, 1921 |
| 1,420,908 | Burrows | June 27, 1922 |
| 1,749,541 | Marr | Mar. 3, 1930 |
| 1,808,081 | Sullivan | June 2, 1931 |

FOREIGN PATENTS

| Number | Country | Date |
|---|---|---|
| 58,043 | Netherlands | Aug. 15, 1946 |
| 60,245 | Sweden | Feb. 16, 1926 |